United States Patent
Xie et al.

(10) Patent No.: US 9,391,311 B2
(45) Date of Patent: Jul. 12, 2016

(54) BATTERY AND MOBILE TERMINAL FOR DETECTING BATTERY CELL DEFORMATION

(71) Applicant: Huawei Device Co., Ltd., Shenzhen (CN)

(72) Inventors: Feng Xie, Beijing (CN); Xuesong Xu, Beijing (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 273 days.

(21) Appl. No.: 14/140,348

(22) Filed: Dec. 24, 2013

(65) Prior Publication Data

US 2014/0106184 A1 Apr. 17, 2014

Related U.S. Application Data

(63) Continuation of application No. PCT/CN2011/078833, filed on Aug. 24, 2011.

(51) Int. Cl.
*H01M 2/34* (2006.01)
*H01M 2/10* (2006.01)
*H01M 10/48* (2006.01)

(52) U.S. Cl.
CPC .............. *H01M 2/34* (2013.01); *H01M 2/1072* (2013.01); *H01M 10/48* (2013.01)

(58) Field of Classification Search
CPC ...... H01M 2/1072; H01M 2/34; H01M 10/48
See application file for complete search history.

(56) References Cited

U.S. PATENT DOCUMENTS

2006/0093896 A1* 5/2006 Hong ............. H01M 2/34 429/61

FOREIGN PATENT DOCUMENTS

| CN | 2727978 Y | 9/2005 |
| CN | 1767232 A | 5/2006 |
| CN | 101286107 A | 10/2008 |
| CN | 201490257 U | 5/2010 |
| CN | 201749909 U | 2/2011 |
| CN | 201898180 U | 7/2011 |
| JP | 2003151603 A | 5/2003 |

* cited by examiner

Primary Examiner — Muhammad Siddiquee
(74) Attorney, Agent, or Firm — Slater Matsil, LLP

(57) ABSTRACT

A battery capable of detecting battery cell deformation is provided. The battery includes a battery cell, a grounded encapsulation part, and a film that is located between the battery cell and the encapsulation part and keeps a separation between the film and the encapsulation part. The film is deployed with a serial impedance cabling, where a resistance value of the serial impedance cabling changes as the length of the serial impedance cabling changes. When deformation of the battery cell exceeds a predetermined value, the film is capable of bearing extrusion of the battery cell and becomes deformed, so that the serial impedance cabling contacts the encapsulation part, so as to short-circuit the serial cabling of a certain length to ground. The battery provided in the embodiments of the present invention is capable of improving safety of the battery cell.

20 Claims, 4 Drawing Sheets

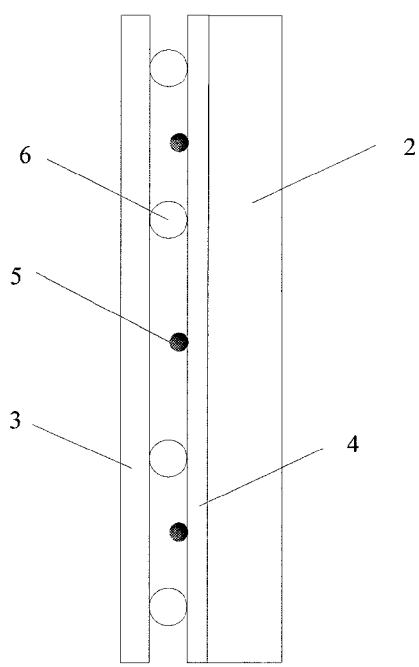
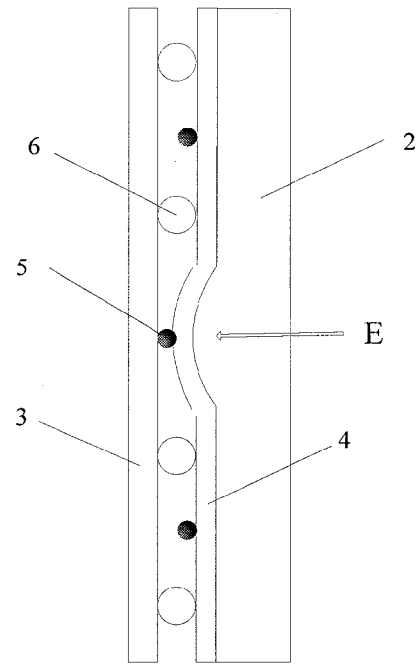
FIG. 3        FIG. 4
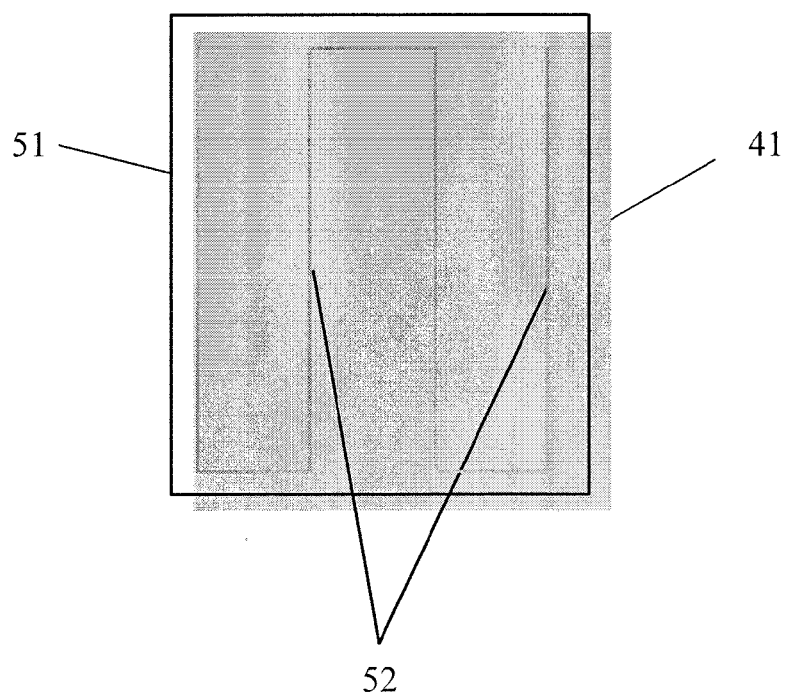
FIG. 5

BATTERY AND MOBILE TERMINAL FOR DETECTING BATTERY CELL DEFORMATION

This application is a continuation of International Application No. PCT/CN2011/078833, filed on Aug. 24, 2011, which is hereby incorporated by reference in its entirety.

TECHNICAL FIELD

Embodiments of the present invention relate to a battery and a mobile terminal that are capable of detecting battery cell deformation.

BACKGROUND

A battery cell is an important constituent of a battery. An existing battery cell mainly includes electrodes, a protective film, and positive and negative electrode pins, and is finally connected to a battery by two function pins.

The existing battery cell ensures safety of the battery cell and reduces a risk during deformation and explosion mainly by means of puncturing the protective film to specify a distention or explosion venting path, or by means of changing the material of the battery cell. However, these are all passive measures, which cannot actively remind a user of a possible risk and ensure usage safety of a terminal.

SUMMARY OF THE INVENTION

Embodiments of the present invention provide a battery and a mobile terminal that are capable of detecting battery cell deformation, so as to actively detect the deformation state of a battery cell, thereby improving safety of the battery cell and ensuring user safety.

Accordingly, an embodiment of the present invention provides a battery, including a battery cell, a grounded encapsulation part, and a film that is located between the battery cell and the encapsulation part and keeps a certain distance from the encapsulation part. The film is deployed with a serial impedance cabling, where a resistance value of the serial impedance cabling changes as the length of the serial impedance cabling changes. When deformation of the battery cell exceeds a predetermined value, the film is capable of bearing extrusion of the battery cell and becomes deformed, so that the serial impedance cabling contacts the encapsulation part, so as to short-circuit the serial cabling of a certain length to ground.

An embodiment of the present invention further provides a mobile terminal, including a battery, where the battery includes a battery cell, a grounded encapsulation part, and a film that is located between the battery cell and the encapsulation part and keeps a certain distance from the encapsulation part. The film is deployed with a serial impedance cabling, where a resistance value of the serial impedance cabling changes as the length of the serial impedance cabling changes. When deformation of the battery cell exceeds a predetermined value, the film is capable of bearing extrusion of the battery cell and becomes deformed, so that the serial impedance cabling contacts the encapsulation part, so as to short-circuit the serial cabling of a certain length to ground.

In the embodiments of the present invention, a film is set between a battery cell and a grounded encapsulation part, a resistance value of a serial impedance cabling on the film is capable of changing as the length of the serial impedance cabling changes, and when deformation of the battery cell exceeds a predetermined value, the film is capable of bearing extrusion of the battery cell and becomes deformed, so that the serial impedance cabling contacts the encapsulation part, so as to short-circuit the serial cabling of a certain length to ground. Because the resistance value of the serial impedance cabling changes after the serial cabling of a certain length is short-circuited to ground, deformation of the battery cell may be obtained by detecting an electric current change caused by a change of the resistance value of the serial impedance cabling, and a terminal user may be informed of the deformation, thereby ensuring usage safety of a terminal.

BRIEF DESCRIPTION OF THE DRAWINGS

To describe the technical solutions in the embodiments of the present invention more clearly, the following briefly introduces accompanying drawings required to be used in the embodiments. Apparently, the accompanying drawings in the following description show merely some embodiments of the present invention, and a person of ordinary skill in the art may still derive other embodiments from these accompanying drawings without creative efforts.

FIG. 3 is a side view of a film when a battery cell is not deformed according to an embodiment of the present invention;

FIG. 4 is a side view of a film when a battery cell is deformed according to an embodiment of the present invention;

FIG. 5 is a schematic view of manufacturing, by coating, a film deployed with a serial impedance cabling according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
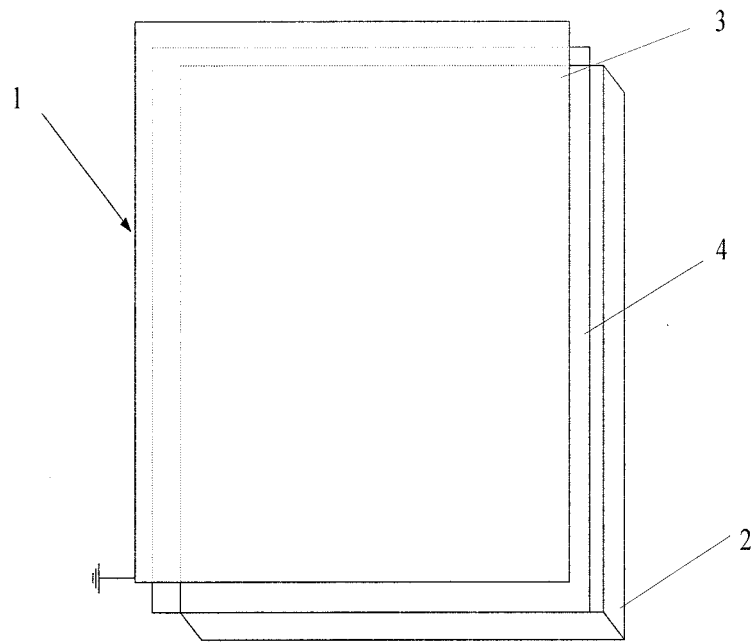
FIG. 1 is a schematic view of a battery cell component of a battery according to an embodiment of the present invention.

FIG. 1 exemplarily provides a schematic structural view of a battery cell component of a battery. As shown in the figure, a battery cell component 1 includes a battery cell 2, an encapsulation part 3, and a film 4 that is located between the battery cell 2 and the encapsulation part 3. It should be noted that the battery cell component 1 in FIG. 1 is only a part schematically illustrated to facilitate understanding of the relationship between positions of the battery cell 2, the encapsulation part 3, and the film 4. The battery cell component 1 in fact is configured such that the battery cell 2 is in the center and is closely wrapped up by the film 4 outside, and the battery cell 2 after being wrapped up by the film 4 is contained in the encapsulation part 3.

The encapsulation part 3 may be a hard shell, for example, a metal outer shell, and in particular, the material of the metal outer shell includes aluminum that is commonly used in the art. The encapsulation part 3 may also be a soft shell, for example, being made of a plastic packaging material. It can be seen from FIG. 1 that the encapsulation part 3 is set to be grounded. Specifically speaking, if the encapsulation part 3 is a hard shell including the exemplary metal outer shell, the encapsulation part 3 may be directly grounded, or if the encapsulation part 3 is a soft shell including that made of the exemplary plastic packaging material, a process similar to that for a film material (introduced specifically hereinafter) may be adopted to process the encapsulation part 3 into a form of entire plane grounding by using an existing process. A grounding mode is known in the art, and for example, the encapsulation part 3 may be connected to a negative electrode of the battery cell, and so on, which is not introduced in detail herein. Besides, to facilitate electric current determination, a surface of the encapsulation part 3 that faces the film 4 is made a plane and conducts electricity and is processed to be grounded.

Figure 2:
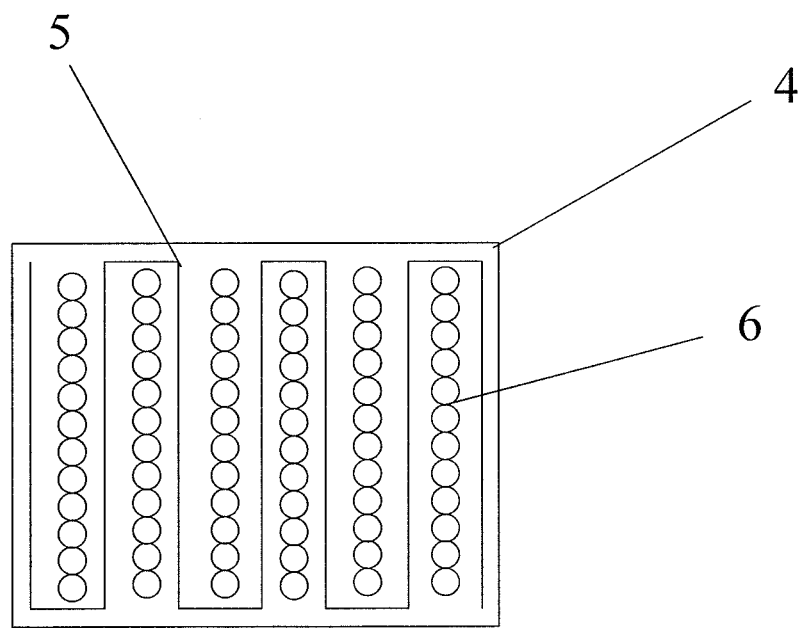
FIG. 2 is a top view of a film deployed with a serial impedance cabling according to an embodiment of the present invention.

The film 4 is a layer of a film material similar to an existing resistive screen ITO (Indium Tin Oxides) thin film. The difference between the film 4 in the embodiments of the present invention and the existing resistive screen ITO thin film is that the film 4 is deployed with a serial impedance cabling, that is, a consecutive impedance cable from beginning to end is formed. The following, with reference to FIG. 2 to FIG. 4, describes the structure of the film in detail. FIG. 2 is a top view of the film deployed with a serial impedance cabling, and FIG. 3 to FIG. 4 are side views of the film deployed with the serial impedance cabling, where FIG. 3 is a side view of the film when a battery cell is not deformed, and FIG. 4 is a side view of the film when the battery cell is deformed.

In FIG. 2, a cabling form of a serial impedance cabling 5 located on a film 4 is a rectangle-shaped serial cabling, and separation points 6 are arranged at intervals between the rectangle-shaped serial cabling. It can be seen from FIG. 3 and FIG. 4 that, the separation points 6 are used to make the film 4 keep a certain separation distance from the encapsulation part 3. The separation points 6 are made of a non-conducting and non-deformable material. For example, the separation points 6 may be made of plastic and may be adhered to the film 4 and/or the encapsulation part 3 by using methods known in the art. The serial impedance cabling 5 is located on a side of the film 4 that faces the encapsulation part 3. During normal working, the serial impedance cabling 5 does not contact the encapsulation part 3 (referring to FIG. 3), and only when deformation of the battery cell exceeds a certain value does the serial impedance cabling 5 contact the encapsulation part 3 (referring to FIG. 4). Furthermore, the separation points 6 are only an example, and spacers in other forms may also be used.

In addition, arrangement is not necessarily in a form of single-row separation as shown in FIG. 2, as long as it is capable of making the film 4 keep a distance from the encapsulation part 3 and making the serial impedance cabling 5 not contact the encapsulation part 3. Whether the serial impedance cabling 5 contacts or does not contact the grounded encapsulation part 3 results in a change of a current path. Because a resistance value of the serial impedance cabling 5 changes as the length of the serial impedance cabling changes, for example, being in direct proportion to the length, whether the serial impedance cabling 5 contacts or does not contact the grounded encapsulation part 3 results in a change of the resistance value of the current path, thereby influencing an electric current change of the current path. The objective of the setting will be introduced together when a working principle of a battery being capable of actively detecting battery cell deformation is introduced in the following.

Forming a serial impedance cabling on a film material is known in the art, including methods such as coating, infiltration, and corrosion. The following takes a coating mode as an example to introduce forming of a serial impedance cabling in the embodiment. FIG. 5 exemplarily provides a schematic view of forming a serial impedance cabling on a film material in a coating mode. First, a film material 41 is provided. Then, the film material 41 and a base plate 51 formed with a window 52 for a rectangular serial cabling are provided. Next, the base plate 51 is placed on the film material 41, and the base plate 51 is coated with a conducting material. Finally, the conducting material forms a rectangular serial impedance cabling through the window 52. Through such a process, the film deployed with an impedance cabling in the embodiment may be obtained.

Figures 6, 7:
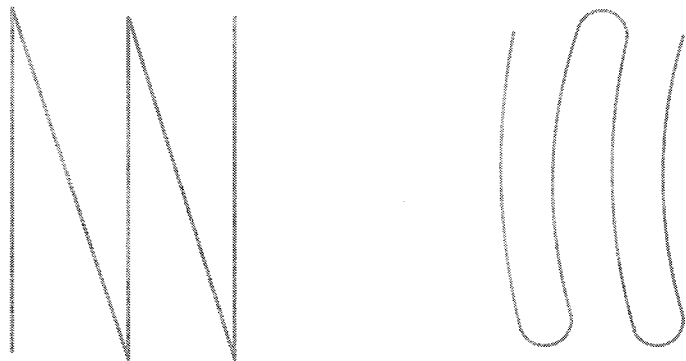
FIG. 6 is a schematic view of a serial impedance cabling mode according to an embodiment of the present invention.
FIG. 7 is another schematic view of a serial impedance cabling mode according to an embodiment of the present invention.

FIG. 6 and FIG. 7 provide two other cabling forms that are different from the serial impedance cabling in FIG. 2. In FIG. 6, a serial impedance cabling forms a sawtooth-shaped serial cabling, and in FIG. 7, a serial impedance cabling forms a circular-arc-shaped serial cabling. A person skilled in the art should know that FIG. 2, FIG. 6 and FIG. 7 only exemplarily provide three cabling modes, but do not limit a cabling mode to the foregoing three types, and other modes that may form a consecutive impedance cable are all acceptable.

Figure 8:
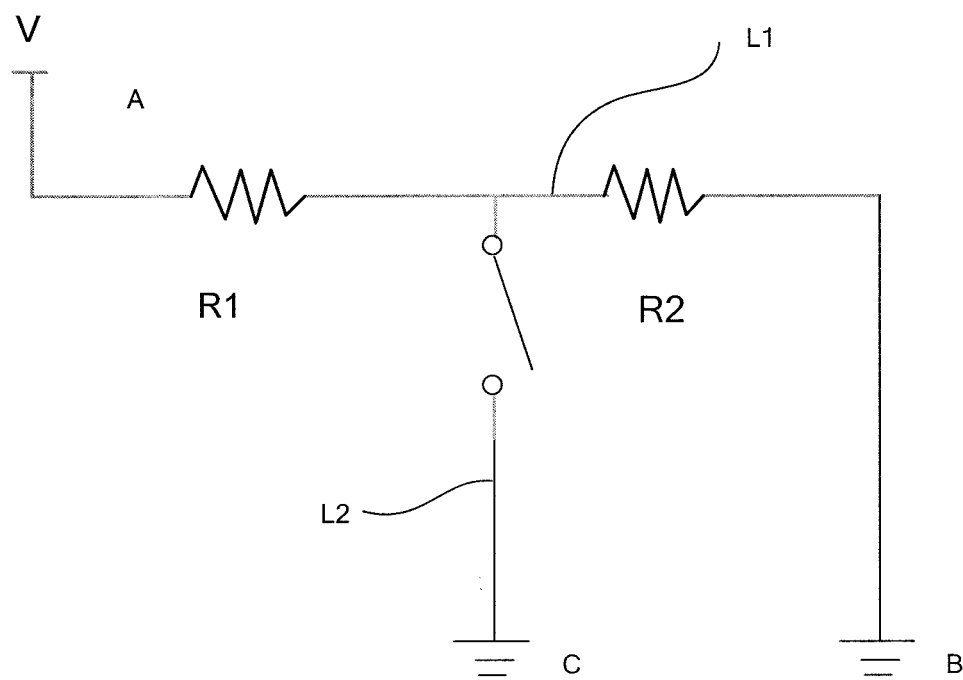
FIG. 8 is a schematic view of a working principle of a battery cell component according to an embodiment of the present invention.

The following, with reference to FIG. 3, FIG. 4 and FIG. 8, introduces a working principle of a battery capable of actively detecting battery cell deformation in the embodiment.

The serial impedance cabling of a film 4 exemplarily includes a resistance R1 and a resistance R2, and the reason why a switch is used for grounding between the resistance R1 and the resistance R2 is related to setting of grounding of the encapsulation part 3. Specifically speaking, when a battery cell 2 does not deform, just as that described in FIG. 3, the encapsulation part 3 and the film 4 keep a certain clearance due to existence of the separation points 6, and the serial impedance cabling 5 on the film 4 does not contact the grounded encapsulation part 3. Thus, a serial electric current path on the film 4 in FIG. 8 is L1, that is, an electric current sequentially flows through the resistance R1 and the resistance R2 from an end A and reaches an end B. When the battery cell 2 deforms, the film 4 located on the battery cell 2 deforms together with the battery cell 2, that is, area E shown by an arrow in FIG. 4 protrudes after deformation, causing deformation of the film 4. When the degree of deformation exceeds a certain value, the serial impedance cabling 5 on the film 4 contacts the encapsulation part 3, and because the encapsulation part 3 is grounded, the electric current path, in FIG. 8, changes from L1 to L2. That is, the electric current only flows through the resistance R1 from the end A and reaches an end C. Obviously, due to a change of an electric current path, a resistance value of the current path changes. Provided that an input voltage V of an electric current detection pin does not change, an electric current of the current path changes.

To be capable of utilizing the change of the electric current of the current path, in the embodiment, an electric current detection pin is added on the basis of the battery cell 2. To facilitate understanding, FIG. 9 exemplarily provides a schematic view of a battery after encapsulation, where an encapsulated battery cell 11 is encapsulated with a battery outer shell by known methods to form a battery 111. It can be seen from this that the battery cell already has two function pins, that is, pin1 and pin2 denoted by reference signs 7 and 8. On the basis of this, an electric current detection pin is added, that is pin3 denoted by a reference sign 9. The electric current detection pin is connected to a current detection circuit of a mobile terminal. In this way, by using the current detection circuit of the mobile terminal, an electric current change caused by deformation of the battery cell 2 can be output to the mobile terminal, thereby notifying a user through the terminal.

Figure 9:
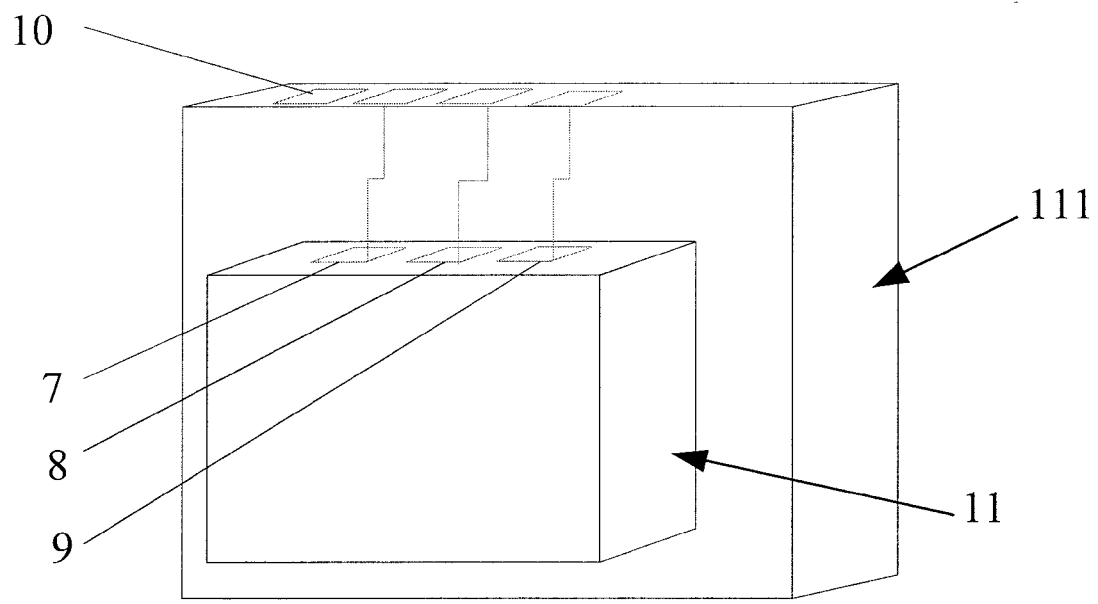
FIG. 9 is a schematic diagram of a battery according to an embodiment of the present invention.

The current detection circuit of the mobile terminal is known in the art and is usually deployed in a chip, which is not described herein. In addition, pin1 and pin2 denoted by the reference signs 7 and 8 in FIG. 9 are usually connected to positive and negative electrodes of the battery, and an existing function pin of the battery is denoted by a reference sign 10 on the battery outer shell, and may be a temperature detection pin or an ID pin of the battery. It is easy to understand that FIG. 9 is only an example, and a pin setting mode and pin quantity can be rationally set after the working principle of the battery is understood.

Figure 10:
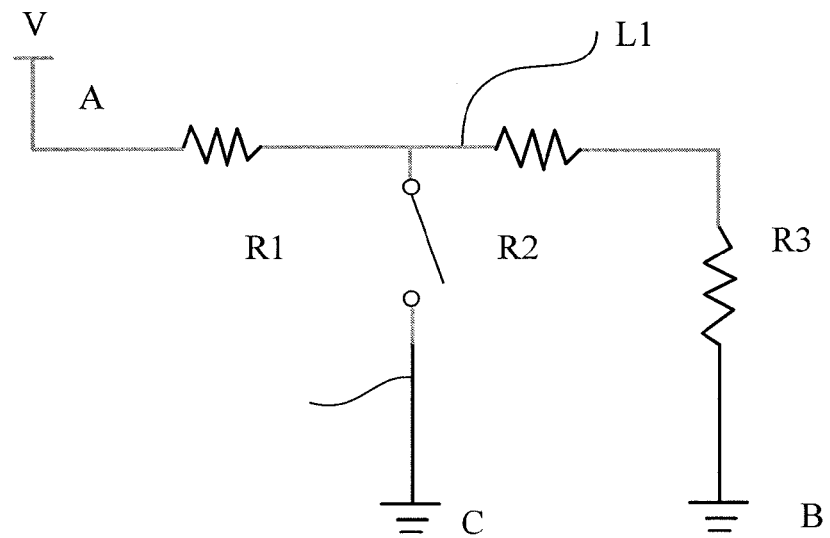
FIG. 10 is an improvement schematic view of a working principle of a battery cell component according to an embodiment of the present invention.

Furthermore, to improve consistency of a current detection threshold, an impedance matching resistance R3 may be added on the basis of the working mode disclosed in FIG. 8, forming an optimized working mode shown in FIG. 10, the essence of which is still utilizing a change of a serial impedance electric current.

Through the foregoing exemplary description, a battery provided in the embodiments of the present invention can actively detect deformation of a battery cell, and inform a terminal user, and especially for a user using a non-removable battery, the reminding is extraordinarily necessary. In this way, with the reminding function, a risk of battery distention or explosion caused by abnormal deformation of the battery cell is also reduced.

What is claimed is:

1. A battery, comprising:
   a battery cell;
   a grounded encapsulation part;
   a film located between the battery cell and the encapsulation part, wherein there is a separation between the film and the encapsulation part;
   a serial impedance cabling located on the film, wherein a resistance value of the serial impedance cabling changes as a length of the serial impedance cabling changes; and
   an electric current detection pin located on the battery cell and separate from first and second pins that are connected to electrodes of the battery cell, wherein the electric current detection pin is connected to the serial impedance cabling, and wherein the electric current detection pin is connected by the serial impedance cabling to the grounded encapsulation part when the serial impedance cabling contacts the grounded encapsulation part.

2. The battery according to claim 1, further comprising a separation point to keep the separation between the film and the encapsulation part.

3. The battery according to claim 2, wherein the electric current detection pin is configured to be connected to an electric current detection circuit of a terminal, wherein the terminal is capable of determining an electric current change caused by a change in the resistance value of the serial impedance cabling.

4. The battery according to claim 3, wherein the serial impedance cabling further comprises an impedance matching resistance connected thereto in series, wherein the impedance matching resistance is configured to improve consistency of a current detection threshold.

5. The battery according to claim 1, wherein the serial impedance cabling located on the film comprises one or more of a sawtooth-shaped serial impedance cabling, a rectangle-shaped serial impedance cabling, and a circular-arc-shaped serial impedance cabling.

6. The battery according to claim 1, wherein the electric current detection pin is configured to be connected to an electric current detection circuit of a terminal, wherein the terminal is capable of determining an electric current change caused by a change in the resistance value of the serial impedance cabling.

7. The battery according to claim 6, wherein the serial impedance cabling further comprises an impedance matching resistance connected thereto in series, wherein the impedance matching resistance is configured to improve consistency of a current detection threshold.

8. A battery, comprising:
   a battery cell;
   a grounded encapsulation part;
   a film located between the battery cell and the encapsulation part, wherein there is a separation between the film and the encapsulation part;
   a serial impedance cabling located on the film, wherein a resistance value of the serial impedance cabling changes as a length of the serial impedance cabling changes; and
   an electric current detection pin located on the battery cell and separate from first and second pins that are connected to electrodes of the battery cell, wherein the electric current detection pin is connected to the serial impedance cabling;
   wherein, when deformation of the battery cell exceeds a predetermined value, the film is capable of bearing extrusion of the battery cell and becoming deformed, and wherein the deformed film is capable of causing the serial impedance cabling to contact the encapsulation part and short-circuit the serial impedance cabling of a certain length to ground, wherein the electric current detection pin is connected by the serial impedance cabling to the encapsulation part when the serial impedance cabling contacts the encapsulation part.

9. The battery according to claim 8, further comprising a separation point to keep the separation between the film and the encapsulation part.

10. The battery according to claim 9, wherein the electric current detection pin is configured to be connected to an electric current detection circuit of a terminal, wherein the terminal is capable of determining an electric current change caused by a change in the resistance value of the serial impedance cabling.

11. The battery according to claim 10, wherein the serial impedance cabling further comprises an impedance matching resistance connected thereto in series, wherein the impedance matching resistance is configured to improve consistency of a current detection threshold.

12. The battery according to claim 8, wherein the serial impedance cabling located on the film comprises one or more of a sawtooth-shaped serial impedance cabling, a rectangle-shaped serial impedance cabling, and a circular-arc-shaped serial impedance cabling.

13. The battery according to claim 8, wherein the electric current detection pin is configured to be connected to an electric current detection circuit of a terminal, wherein the terminal is capable of determining an electric current change caused by a change in the resistance value of the serial impedance cabling.

14. A mobile terminal, comprising:
a battery, comprising:
a battery cell;
a grounded encapsulation part; and
a film located between the battery cell and the encapsulation part, wherein there is a separation between the film and the encapsulation part;
a serial impedance cabling located on the film, wherein a resistance value of the serial impedance cabling changes as a length of the serial impedance cabling changes; and
an electric current detection pin located on the battery cell and separate from first and second pins that are connected to electrodes of the battery cell, wherein the electric current detection pin is connected to the serial impedance cabling;
wherein, when deformation of the battery cell exceeds a predetermined value, the film is capable of bearing extrusion of the battery cell and becoming deformed, and wherein the deformed film is capable of causing the serial impedance cabling to contact the encapsulation part and short-circuit the serial impedance cabling of a certain length to ground, wherein the electric current detection pin is connected by the serial impedance cabling to the encapsulation part when the serial impedance cabling contacts the encapsulation part.

15. The mobile terminal according to claim 14, further comprising a separation point to keep the separation between the film and the encapsulation part.

16. The mobile terminal according to claim 15, further comprising an electric current detection circuit configured to connect to the electric current detection pin and determine an electric current change caused by a change in the resistance value of the serial impedance cabling.

17. The mobile terminal according to claim 16, wherein the mobile terminal is capable of providing a warning based on the electric current change determined by the electric current detection circuit.

18. The mobile terminal according to claim 14, wherein the serial impedance cabling located on the film comprises one or more of a sawtooth-shaped serial impedance cabling, a rectangle-shaped serial impedance cabling, and a circular-arc-shaped serial impedance cabling.

19. The mobile terminal according to claim 14, further comprising an electric current detection circuit configured to connect to the electric current detection pin and determine an electric current change caused by a change in the resistance value of the serial impedance cabling.

20. The mobile terminal according to claim 19, wherein the mobile terminal is capable of providing a warning based on the electric current change determined by the electric current detection circuit.

* * * * *